United States Patent [19]

Seaman

[11] Patent Number: 4,661,884

[45] Date of Patent: Apr. 28, 1987

[54] MINIATURE, MULTIPLE LAYER, SIDE MOUNTING HIGH FREQUENCY BLOCKING CAPACITOR

[75] Inventor: Harry V. Seaman, Northport, N.Y.

[73] Assignee: American Technical Ceramics Corp., Huntington Station, N.Y.

[21] Appl. No.: 837,744

[22] Filed: Mar. 10, 1986

[51] Int. Cl.⁴ .................. H01G 4/38; H01G 7/00; H02B 1/04

[52] U.S. Cl. .................. 361/306; 29/25.42; 361/328

[58] Field of Search ......... 361/303, 306, 308, 309, 361/310, 320, 321, 328, 329, 330, 400, 402, 403, 433 C; 29/25.42

[56] References Cited

U.S. PATENT DOCUMENTS

| | | | |
|---|---|---|---|
| 2,968,752 | 1/1961 | Rubinstein et al. | 361/330 |
| 3,444,436 | 5/1969 | Coda | 361/306 X |
| 3,651,548 | 3/1972 | Behn | 361/330 X |
| 4,470,099 | 9/1984 | Sawairi | 361/328 |
| 4,563,724 | 1/1986 | Behn | 361/306 |

FOREIGN PATENT DOCUMENTS 2529378  12/1983  France ................. 361/321

OTHER PUBLICATIONS

IBM Technical Disclosure Bulletin Mar. 1963, vol. 5, No. 10, pp. 115–116.

Primary Examiner—Donald A. Griffin
Attorney, Agent, or Firm—Edward H. Loveman

[57] ABSTRACT

A miniature side mounting high frequency blocking capacitor has a rectangular dielectric block in which are generally flat, L-shaped electrodes disposed alternately in opposite longitudinal, parallel orientation. The electrodes have lateral tabs whose edges are flush with one side of the block. A conductive layer covers this one side and is divided by a groove extending across the block to define two sections which are the electrical terminals of the capacitor. The capacitor may be mounted laterally to a circuit board by soldering the two conductive terminal sections thereto.

7 Claims, 12 Drawing Figures

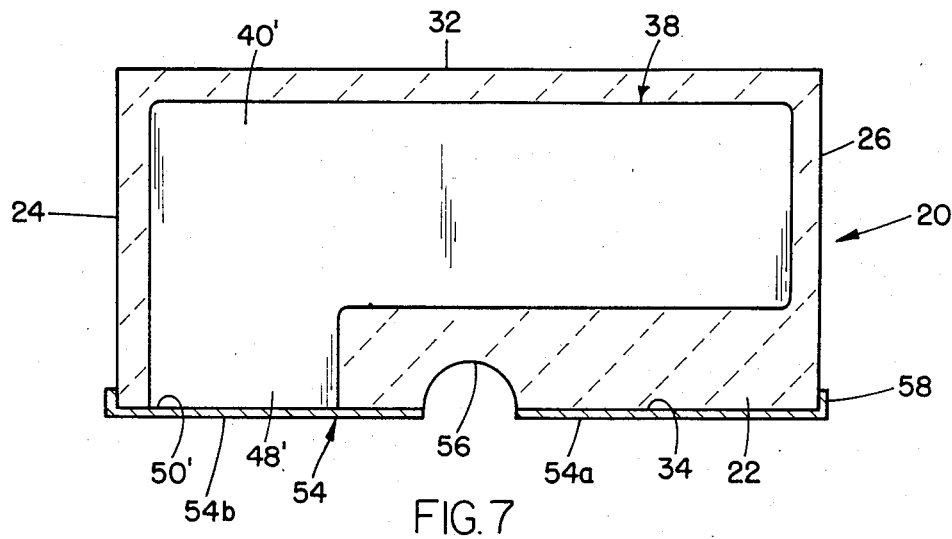
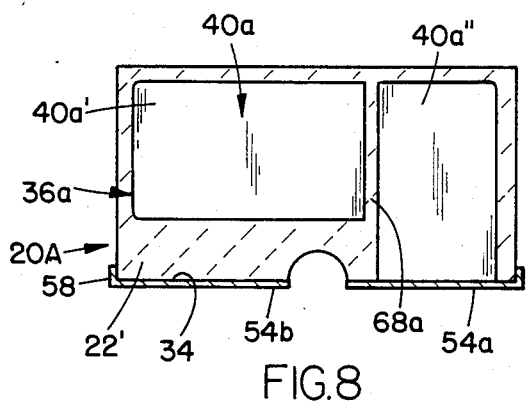
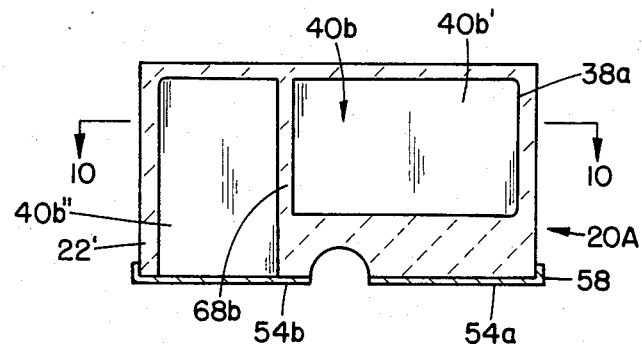
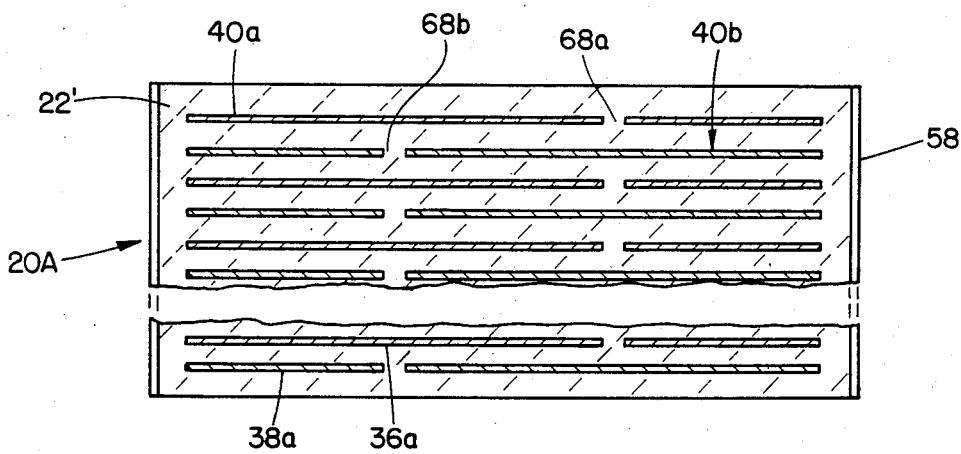

MINIATURE, MULTIPLE LAYER, SIDE MOUNTING HIGH FREQUENCY BLOCKING CAPACITOR

BACKGROUND OF THE INVENTION

1. Field of the Invention

This invention relates the art of capacitors having multiple electrodes, and more particularly concerns capacitors having spaced thin electrodes embedded in a dielectric block, and used to block passage therethrough of currents in a predetermined range of high frequencies; and more specifically concerns an improved multiple layer capacitor having closely spaced internal electrodes of opposite polarity having terminals at one side of the capacitor.

2. Description of the Prior Art

In a conventional multiple layer capacitor such as described in U.S. Pat. No. 3,838,320, there is an inductive path of relatively high inductance between the two terminals of the capacitor and extending through the electrodes in the dielectric block. The high inductance causes the capacitor to have a low series resonant frequency and low parallel resonant frequency points. As a result ordinary miniature multiple layer capacitors cannot be used effectively for very high frequency blocking purposes, for example, at 3 gigaherz.

SUMMARY OF THE INVENTION

The present invention is directed at overcoming the limitations of prior multiple layer capacitors when used for very high frequency blocking purposes. According to the invention there is provided a miniature multiple layer capacitor in which internal inductance is minimized and in which terminals of electrodes of opposite polarity are brought out at one side of the capacitor. This structure makes it possible to mount the capacitor on its side on a printed circuit board with all electrodes perpendicular to the circuit board. The resulting capacitive impedance and parallel resonant frequency of the capacitor are maximized and can then occur, for example, at 3 gigaherz for optimum high R.F. current blocking purposes. This contrasts with conventional multiple layer capacitors which can be mounted with any electrode orientation to the circuit board. Such capacitors have a maximum series resonant frequency about one gigaherz and a parallel resonant frequency about 2 gigaherz. The present invention can increase the current blocking frequency at least 50% over the best prior conventional capacitors. In addition, mounting of the capacitor on a circuit board is simplified. Other advantages of the present invention are simplified capacitor structure and simplified more economical fabrication procedures.

These and other objects and many of the attendant advantages of this invention will be readily appreciated as the same becomes better understood by reference to the following detailed description when considered in connectio with the accompanying drawings in which:

BRIEF DESCRIPTION OF THE DRAWINGS

FIG. 6 and 7 are longitudinal sectional views taken through the capacitor per se, along lines 6—6 and 7—7 of FIG. 4;

FIG. 8 and FIG. 9 are reduced sectional views similar to FIGS. 6 and 7 respectively illustrating a modification of the invention;

FIG. 10 is an enlarged cross sectional view, with portions broken away, taken along line 10—10 of FIG. 9;

DESCRIPTION OF THE PREFERRED EMBODIMENTS

Figure 1:
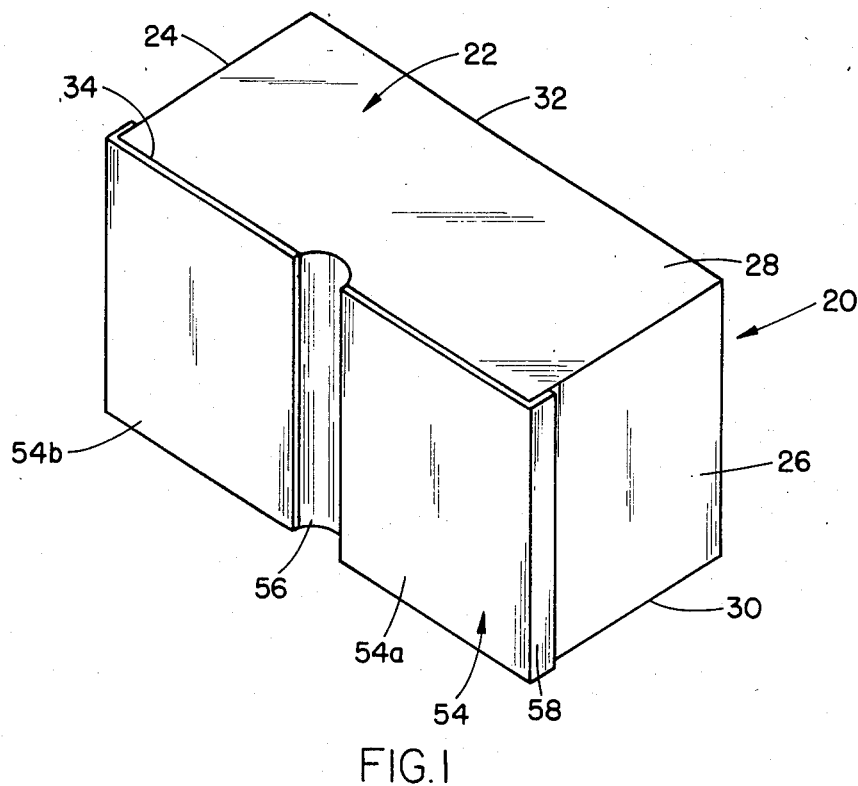
FIG. 1 is a greatly mangified isometric view of a miniature capacitor embodying the invention, rotated 90 degrees to show its mounting side.
Figure 2:
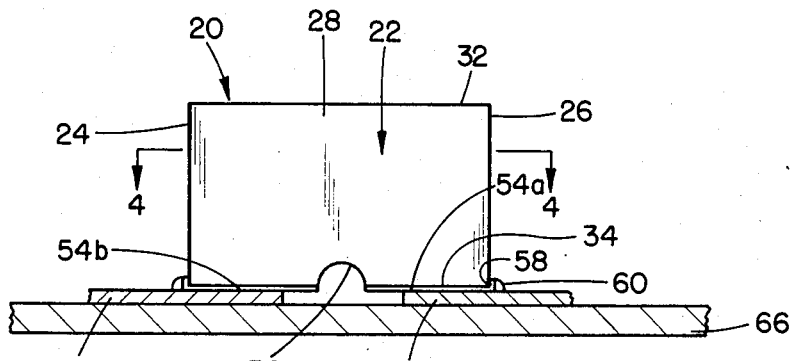
FIG. 2 is a reduced side view of the capacitor shown mounted on a printed circuit board.
Figure 3:
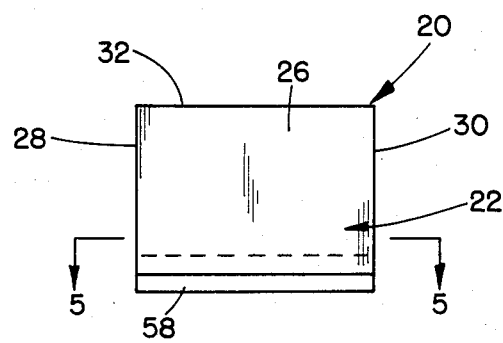
FIG. 3 is an end view of the capacitor per se.
Figure 4:
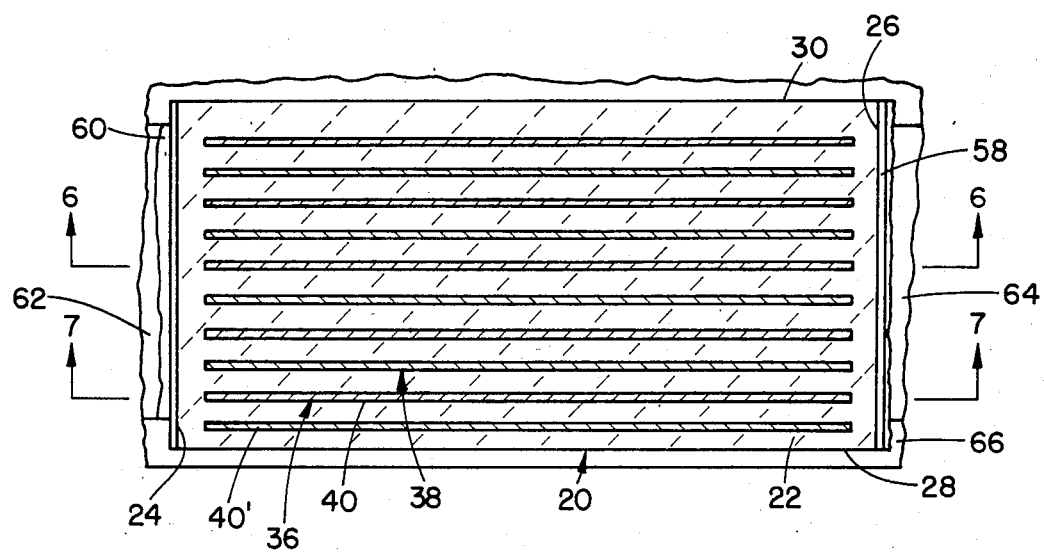
FIG. 4 is an enlarged cross sectional view taken along line 4—4 of FIG. 2.
Figure 5:
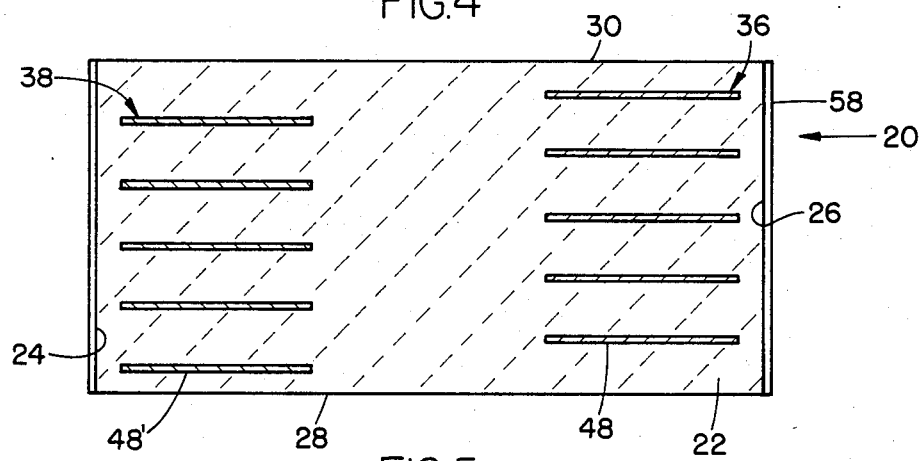
FIG. 5 is an enlarged cross sectional view of the same scale as FIG. 4, but taken along line 5—5 of FIG. 3.
Figure 6:
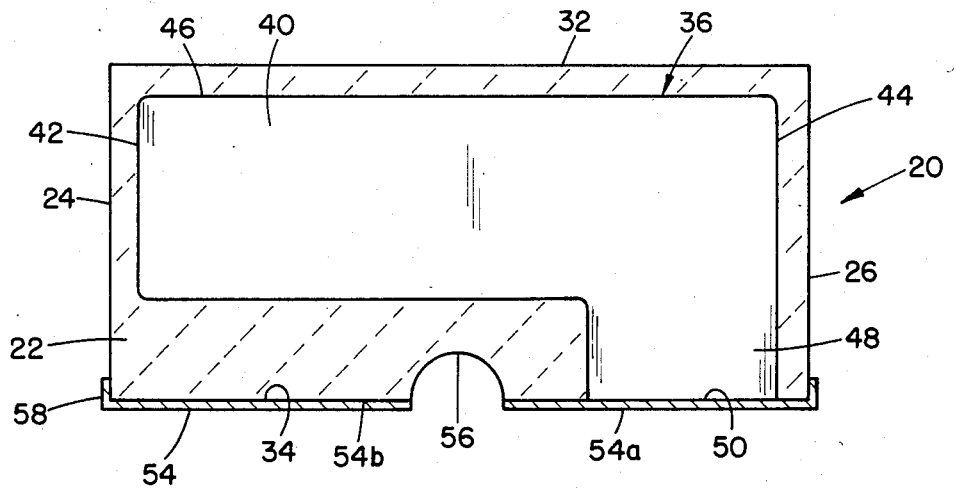

Referring now to the drawings wherein like reference characters designate like or corresponding parts throughout, there is illustrated in FIGS. 1-7, a miniature capacitor generally designated as reference numeral 20 of monolithic structure with a rectangular block 22 made of a dielectric material such as a low-loss ceramic. The block 22 has flat rectangular ends 24, 26, opposed sides 28, 30, and 32, 34. Encapsulated in the block 22 are two sets of thin, electrically conductive, flat layers 36, 38, which constitute the electrodes of the capacitor 20. The electrodes 36, 38 are disposed in alternation or interleafed. Each of the electrodes 36 as best shown in FIGS. 6 has a wide rectangular body 40 extending across almost the entire length of the block 22. End edges 42, 44 and lateral edge 46 are slightly spaced from the flat ends 24, 26 and the side 32 of the block 22. Each electrode 36 shown in FIGS. 4, 5 and 6 has a laterally extending tab 48 whose outer edge 50 is flush with the side 34 of the block 22. The tab 48 extends longitudinally of the block 22 from the end 26 no more than ⅓ the length of the block 22. Each electrode 38 has a shape similar to the electrode 36. That is, the electrode 38 has a wide rectangular body 40' extending almost the entire length of the block 22. A laterally extending tab 48' (FIG. 7) is spaced from the tab 48 longitudinally of the block 22. An edge 50' is flush with the side 34 and parallel to the edge 50. The tab 48' extends no more than ⅓ the length of the block 22 from the end 24. The tabs 48, 48' and the bodies 40, 40' are clear of the center of the block 22 at the side 34 which is coated with a thin, electrically conductive bonded terminal layer 54, divided into two parallel section 54a, 54b by a groove 56, cut through the layer 54 and extending partially into the block 22 at the side 34. The groove 56 extends entirely across the block between the sides 28 and 30.

The thin electrodes 36, 38 are spaced slightly apart. For example, if each electrode is no more than 2 mils thick and is spaced aout 2 mils from each adjacent electrode, and if as many as fifty electrodes are embedded, the entire width of the miniature capacitor 20 between the sides 28, 30 will be only about ⅛ of an inch. Such a capacitor may have a capacitance of about 47 picofarads, a series resonance frequency of about one (1) gigaherz and a parallel resonance frequency of about three (3) gigaherz.

The conductive layer 54 has narrow end portions 58 which extend slightly along the ends 24 and 26 of the block 22. This arrangement facilities application of solder 60 (shown in FIGS. 2 and 4) to secure the capacitor 20 to a pair of printed conductive terminals 62, 64 of opposite polarity on an insulative circuit board 66.

FIGS. 8–10 show how splits or gaps 68a, 68b may be provided in the long bodies 40a, 40b of the respective electrodes 36a and 38a in a dielectric block 22', so that each electrode has two coplanar spaced sections 40a', 40a" and 40b', 40b". It will be noted that the splits or gaps 68a, 68b are spaced apart longitudinally of the of the capacitor block 22'. The electrode sections 40a" and 40b" float free of any direct circuit connection in the capacitor block 22'. This construction increases the number of electrodes, and decreases capacitance of the capacitor 20A, and reduces series resistance at high frequencies. Although series resonance frequency of the capacitor 20A is reduced, as compared to the capacitor 20 parallel resonance frequency is less affected, thereby increasing the impedance at parallel resonance and increasing the frequency blocking effect at very high frequencies.

Figure 11:
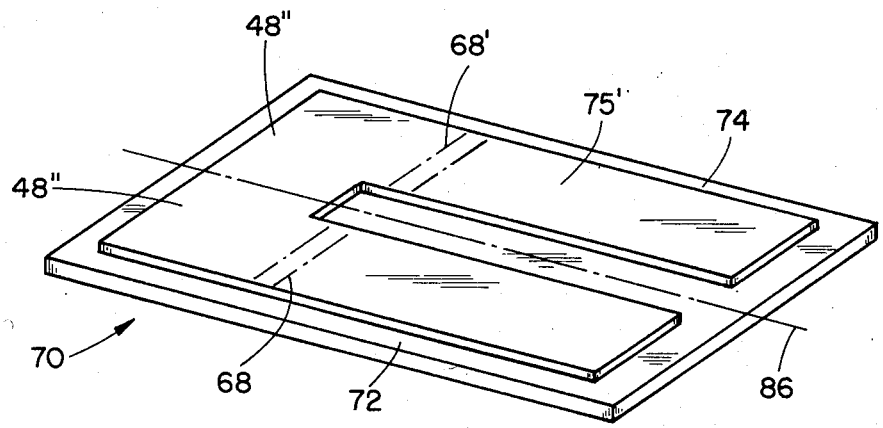
FIG. 11 is an enlarged perspective view of a wafer assembly which can be used in fabricating the capacitor.
Figure 12:
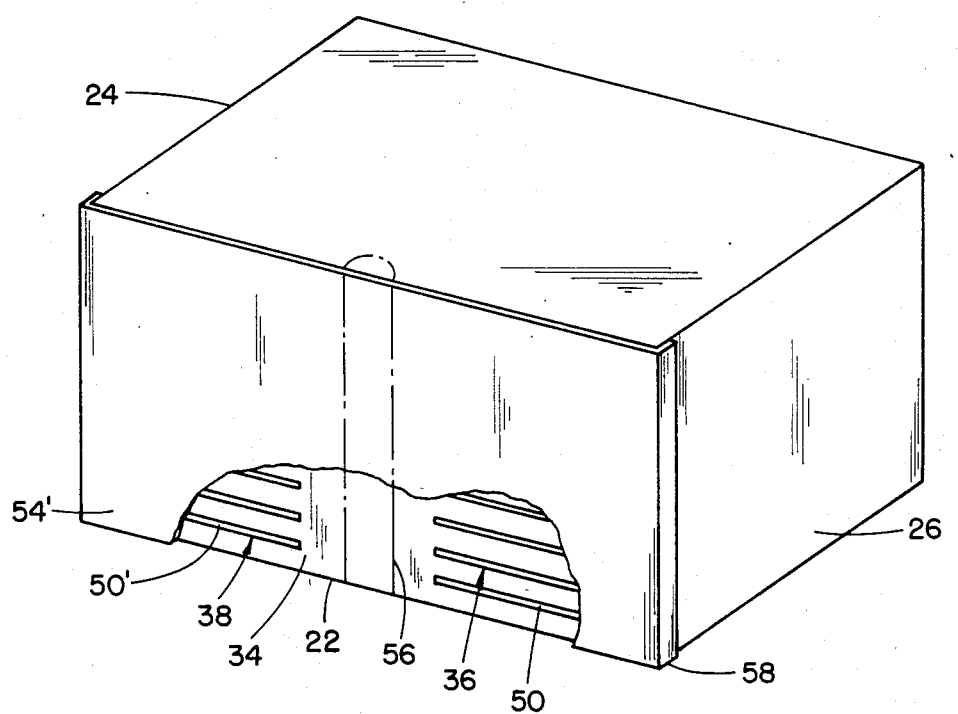
FIG. 12 is a perspective view of a capacitor in course of fabrication according to the invention shown with side terminal layer applied, part of which is broken away to show electrode ends.

FIGS. 11 and 12 illustrate steps in a preferred method of fabricating the capacitor 20 according to the invention. A multiplicity of identical wafer assemblies are provided of which one wafer assembly 70 is shown. The wafer assembly has a thin, flat rectangular wafer 72 made of unfired ceramic material, also known as "greenware". A thin electrically conductive, rectangularly U-shaped layer 74 with long legs 75' and a short, flat bight 48" is applied by silk screening or other conventional technique, on one side of the wafer 72. A cross cut can then be made entirely across the wafer on a central line 86 to divide the wafer 72 into identical halves. The conductive layer 74 will be divided into two flat, L-shaped parts which constitute the electrodes. The short portions of the bight 48" will define tabs 48 or 48' as shown in FIGS. 6 and 7. The cut edges of the tabs will be flush with the cut free edges of the wafer halves. Then a multiplicity of wafer electrode assemblies may be stacked in a pile, with legs 75' of alternate electrodes oppositely oriented, and cut edges of the wafers in parallel registration. This will dispose the exposed tab edges 50 and 50' at the same side 34 of the pile in longitudinally spaced, parallel disposition as shown in FIG. 12. The pile can then be fired to fuse the entire assembly into a monolithic unit. The monolithic block 22 is shown in FIG. 12 after being fired. Then the lateral electrically conductive termanal layer 54' is applied and bonded, with the endcs 58 extending slightly along the block ends 24 and 26. Thereafter the groove 56 will be cut centrally across the layer 54' at the side 34 of the block 22, to separate layer 54' into two sections 54a and 54 shown in FIGS. 1–7. If the gaps 68a, 68b are to be provided in the several electrodes as shown in FIGS. 8–10, the cuts 68 and 68' can be made in each electrode body 75 before the wafer assemblies 70 are stacked to form a pile to be fired. Alternatively the layer 74 can be made initially with the gaps 68a, 68b.

The capacitors can be manufactured economically by mass production techniques; using known materials for the dielectric, electrodes, and terminal layers. The capacitors can be made in various sizes with various numbers and sizes of electrodes depending on specified current carrying capacity, operating frequency, and other electrical parameters.

It should be understood that the foregoing relates to only a limited number of preferred embodiments of the invention which have been by way of example only, and that it is intended to cover all changes and modifications of the example of the invention herein chosen for the purpose of the disclosure, which do not constitute departures from the spirit and scope of the invention.

What is claimed is:

1. A miniature, high frequency blocking capacitor, comprising:
    a block of dielectric material having at least one flat side;
    a multiplicity of spaced, thin, flat electrodes in said block disposed perpendicular to said one side, with each of said electrodes having a flat body which is comprised of two coplanar segments separated by a gap;
    an electrically conductive layer applied to said one side of said block;
    said block having a groove formed therein at said one side dividing said layer into separate, spaced, coplanar sections, each of said electrodes having a tab integral with one of said segments and extending laterally of an coplanar with said body and terminating at said one side for contacting one of said sections of said layer, each one of said sections being adapted for attachment to a differently polarized terminal of an external electric circuit;
    wherein said portions of a first group of said electrodes contact one of said sections of said layer, and wherein said portions of a second group of said electrodes contact another one of said sections, said electrodes in said first group alternating with said electrodes in said second group across said block; and
    whereby inductance of said capacitor between said sections of said layer is minimized, so that the minimum frequency of parallel resonance of said capacitor is approximately three times the series resonant frequency of the capacitor, to maximize the blocking effect upon high frequency currents at said parallel resonant frequency.

2. A miniature capacitor as defined in claim 1, wherein said block has flat, rectangular other sides perpendicular to said one side, said electrodes being parallel to said other sides, said body of each of said electrodes being substantially rectangular and slightly smaller in size than each of said other sides of said block.

3. A miniature capacitor as defined in claim 2, wherein said groove extends across said one side of said block between said other sides thereof to separate said layer entirely to form said separate sections.

4. A miniature capacitor as defined in claim 3, wherein said electrodes have such number, size, spacing and thickness that said parallel resonant frequency is approximately three gigaherz.

5. A miniature capacitor as defined in claim 4, wherein the width of said block between said other sides is approximately ⅛ of an inch.

6. A miniature capacitor as defined in claim 1, wherein said layer has opposite narrow ends turned up and bonded to opposite ends of said block for securing said capacitor to said terminals of said electric circuit.

7. A method of fabricating a miniature capacitor comprising the steps of:
    applying a thin, flat, rectangularly U-shaped conductive layer to a flat dielectric wafer, said layer having long legs and a short bight;

cutting said wafer transversely across to form two smaller wafers while dividing said layer at its bight to define two flat electrodes with lateral tabs whose free edges are flush with adjacent edges of said smaller wafers;

stacking a plurality of said smaller wafers to form pile; and firing said pile to form a monolithic block.

* * * * *